US012140911B2

(12) United States Patent
Zaugg et al.

(10) Patent No.: US 12,140,911 B2
(45) Date of Patent: Nov. 12, 2024

(54) DEVICE FOR TEMPORARILY STOPPING THE OPERATION OF A MECHANICAL WATCH

(71) Applicant: Montres Breguet S.A., L'Abbaye (CH)

(72) Inventors: Alain Zaugg, Le Sentier (CH); Christophe Riedo, Le Lieu (CH)

(73) Assignee: Montres Breguet S.A., L'Abbaye (CH)

( * ) Notice: Subject to any disclaimer, the term of this patent is extended or adjusted under 35 U.S.C. 154(b) by 489 days.

(21) Appl. No.: 17/503,689

(22) Filed: Oct. 18, 2021

(65) Prior Publication Data

US 2022/0269220 A1 Aug. 25, 2022

(30) Foreign Application Priority Data

Feb. 19, 2021 (EP) .................................... 21158166

(51) Int. Cl.
*G04F 7/08* (2006.01)
*G04B 15/14* (2006.01)
*G04B 17/28* (2006.01)

(52) U.S. Cl.
CPC ........... *G04F 7/0804* (2013.01); *G04B 15/14* (2013.01); *G04B 17/285* (2013.01)

(58) Field of Classification Search
CPC ...... G04F 7/0804; G04B 15/14; G04B 17/285
See application file for complete search history.

(56) References Cited

U.S. PATENT DOCUMENTS

2020/0004206 A1* 1/2020 Braun .................. G04B 17/285

FOREIGN PATENT DOCUMENTS

| | | | | |
|---|---|---|---|---|
| CN | 110658710 A | 1/2020 | | |
| EP | 1 617 305 A1 | 1/2006 | | |
| EP | 2787400 A1 * | 10/2014 | ........... | G04B 17/285 |
| EP | 3 588 200 A1 | 1/2020 | | |

OTHER PUBLICATIONS

European Search Report for corresponding EP 21158166, dated Jun. 30, 2021.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A device (100) to temporarily stop the operation of a mechanical watch, in particular when time resetting the watch. The device includes at least three levers (4) assembled and disposed in a circle on a plate of the mechanical horological movement. At least one action member (2) of the levers (4) is provided to switch them together from a rest mode to an active mode to act on a stop lever (17) of the device. The stop lever is arranged to temporarily stop a balance spring (14) of the mechanical movement. The activation of the stop lever (17) is performed by at least one of the levers (4) regardless of the position of the stop lever (17).

20 Claims, 5 Drawing Sheets

DEVICE FOR TEMPORARILY STOPPING THE OPERATION OF A MECHANICAL WATCH

CROSS REFERENCE TO RELATED APPLICATIONS

This application claims priority to European Patent Application No. 21158166.5 filed Feb. 19, 2021, the entire contents of which are incorporated herein by reference

FIELD OF THE INVENTION

The invention relates to a device for temporarily stopping the operation of a mechanical watch, in particular a mechanical tourbillon watch, and preferably when time setting the watch. For a mechanical tourbillon watch, the tourbillon cage encloses a mechanical oscillator connected to an escapement mobile.

The invention also relates to a mechanical tourbillon watch, which comprises a device for temporarily stopping the operation of the watch.

BACKGROUND OF THE INVENTION

As a reminder in watchmaking, a tourbillon, also called a "rotating cage", is a horological complication, added to the escapement mechanism, intended to improve the precision of mechanical watches by counterbalancing the disturbances of the isochronism of the resonator due to the earth gravity. The fundamental criterion, which marks a tourbillon, in relation to a carousel in particular, is the presence of a fixed geartrain on which the tourbillon cage meshes. Generally, the tourbillon cage is rotatably mounted between two fastening points.

The primary function of the tourbillon is to rotate the watch resonator relative to gravity at a constant speed in order to average the effects of this gravity on the isochronism of the resonator. The escapement is coupled to the resonator to ensure its maintenance and to regulate the speed of rotation of the watch wheels (counting). It interacts therewith once or twice per period of oscillation. The angle travelled by the resonator during the interaction is called the angle of lift. The remainder of the resonator's travel is called the additional angle or arc.

During the additional angle, the resonator may be in contact with the escapement (frictional rest escapement) or without contact (free escapement). During the angle of lift, the escapement performs two main phases, which are disengagement (or count) and pulse (or maintenance).

For time resetting a mechanical watch, it is known to watchmakers to use a stop lever device to temporarily stop the operation of the mechanical watch. The device allows in particular to stop the operation of the watch when the user pulls the crown to perform time setting. Generally, the lever-stop mechanism is controlled by the time-setting mechanism and acts on the resonator to block it in a stationary position, which interrupts the counting and stops the movement of the finishing and display geartrain. More specifically, it is a spring leaf resting on a felloe of the balance spring, which constitutes the resonator. As this leaf stops the balance in a random position, it is possible to stop the balance in its rest position, in which case restarting the balance after its release by the mechanism is not guaranteed.

In this regard, mention may be made of U.S. Pat. No. 6,196,713 B1, which describes an arrangement for adjusting the minute hand of a timepiece which has at least minute and second hands, having an adjustment rod which can be axially displaced from a normal position to an adjustment position. In an adjustment position, the adjustment unit allows to trigger or stop the operation of a spring drive, for example to stop the balance spring (resonator) by a stop lever system so as to carry out a time resetting of the timepiece. However, it is noted that such an arrangement is difficult to achieve for a tourbillon watch where the resonator is housed in the tourbillon which is rotating on itself.

Patent EP 2 703 912 B1 describes a device for stopping a balance spring (resonator) mounted in a tourbillon of a mechanical watch. The device comprises two stop levers each pivotally mounted on a lever pivot axis, to be able to switch them from a rest position where the balance and the tourbillon can rotate freely and a stop position where at least one of the levers is contacted with the balance to stop it. In addition, pre-stressing means are provided for each of the stop levers, so that the force exerted on the balance thanks to the stop levers can act separately. Direct action of each stop lever separately can cause a problem in effectively stopping the balance spring during a time reset of the watch and regardless of the position of the tourbillon cage, which can make a full revolution.

Patent EP 2 787 400 B1 describes a tourbillon horological movement with a balance stop mechanism. The tourbillon comprises in a cage between a lower cage part and an upper cage part, the balance spring. The stop mechanism comprises a stop element which is rotatably integral with the cage to contact the balance in a stop position, and a device for actuating the stop element. The stop element may be in the shape of a disc coaxial with the cage to frictionally engage with the balance to stop it. Long-term wear of the balance spring can thus occur due to such a stop contact by the disc.

SUMMARY OF THE INVENTION

For the present invention, it is sought to perform a temporary stop of the operation of a mechanical watch, in particular of a mechanical tourbillon watch, during a time reset of the watch.

This invention guarantees instantaneous stopping and restarting of the tourbillon and the balance spring which are visible through an opening in the dial of current tourbillon constructions. This invention also allows to guarantee a minimum winding angle of the spiral which ensures proper operation of the balance after its release.

The object of the invention is therefore to overcome the disadvantages of the prior art by providing a device for temporarily stopping the operation of a mechanical watch, in particular of a mechanical tourbillon watch, overcoming the disadvantages of the devices of the aforementioned prior art.

To this end, the invention relates to a device for temporarily stopping the operation of a mechanical watch, in particular of a mechanical tourbillon watch, which comprises the features defined in independent claim 1.

Particular embodiments of the device for temporarily stopping the operation of a mechanical watch, in particular of a mechanical tourbillon watch, are also described in dependent claims 2 to 15.

An advantage of the stop device lies in the fact that it comprises several levers disposed in a circle on a plate of the mechanical movement and intended to be displaced together from a rest position to an active position under the simultaneous action of a member concentric with the axis of rotation of the balance spring or the tourbillon cage. In the active position, in a first embodiment, the levers rotated in the active position, will push outwards the control rod of a stop lever rotatably mounted on a cage support so that one end of the stop lever contacts a central cam of the balance so as to stop the mechanical movement to reset the time of the watch. The arrangement of the levers, which can be pivoted and mounted on the plate in a circle, allows to have a control edge in an active position of the levers to actuate the stop lever to stop the balance regardless of the position of the tourbillon cage, in the case of a watch with a mechanical tourbillon movement.

Advantageously, the levers rotated in an active position on the plate can temporarily stop the movement by immobilising the oscillation of the balance spring and also by immobilising the tourbillon cage mainly by the friction of the contact of the control rod of the stop lever on one of the levers.

According to a second embodiment, the levers disposed in a circle will be rotated to push the control rod of a stop lever inwards to block the mechanical movement when time resetting the watch by temporarily stopping the balance spring, and all the movement finishing wheels. Six levers disposed in a circle can be provided in this non-limiting case.

According to a third embodiment of operation equivalent to the first embodiment, all the levers consisting of flexible leaf elements together form a single component. The control ring can be rotated by the control connecting-rod so as to push the flexible leaf elements into an active position to control the temporary stop of the operation of the watch. In this case, oblong-shaped openings are not provided on each lever, since it is acted on the flexibility of the spring leaves so as to allow all the levers to automatically return to the rest position in the inactive position of the control ring. The design of this mechanism can be reversed with a free position of the spring leaves corresponding to the active position and a constrained position corresponding to the inactive or rest position.

Advantageously, a proposed mechanical solution of the device does not penalise the aesthetics of the tourbillon, and does not penalise the inertia of the tourbillon by allowing to stop the oscillator. The stop lever can also ensure that the oscillator is stopped, while the levers disposed in a circle on the plate can serve as a brake of the tourbillon cage. It can be expected to have a rough surface or with small teeth around the periphery of the levers to ensure better braking of the tourbillon cage.

Advantageously, provision can be made of at least three levers or four levers disposed in a circle on the plate to be rotated together by a ring connected to the levers. The levers are each rotatably mounted by an axial rotation rod on the stage so as to serve as a guide for the rotation of the activation ring of the levers. The ring is rotated by a control connecting-rod connected to a member for time resetting the watch from a rest position to an active position.

The invention also relates to a watch with a mechanical tourbillon movement which comprises the device for temporarily stopping the operation of the mechanical movement of the watch, and which comprises the features of independent claim 16.

BRIEF DESCRIPTION OF THE DRAWINGS

The purposes, advantages and features of a device for temporarily stopping the operation of a mechanical watch, in particular of a mechanical tourbillon watch, will appear better in the following description, in particular with regard to the drawings wherein.

DETAILED DESCRIPTION OF THE INVENTION

In the following description, various members or elements of the mechanical movement watch with its device for temporarily stopping the operation of the mechanical movement, which are well known in this technical field, will only be briefly described.

It should be noted first of all that a device is mainly described below for performing a temporary stop of the operation of the mechanical movement, an instantaneous stop when switching from the normal position to the time-setting position and ensuring restarting with a minimum amplitude of the balance when switching from the time-setting position to the normal position of a mechanical tourbillon watch, in particular when time resetting said watch. In addition, the stop device is preferably a stop device having a stop lever. However, it can be considered to use such a device to temporarily stop the operation of the mechanical movement for a conventional watch without a tourbillon.

In the case of a mechanical tourbillon watch, the cage encloses a resonator, which is preferably a balance spring and an escapement mechanism, which in particular comprises an escapement mobile as explained briefly below. For all the embodiments described below, the device for temporarily stopping the operation of the mechanical watch comprises first of all a stop lever to block the balance spring, in particular when time resetting the watch. The stop lever rotates with the tourbillon cage, and can be activated to temporarily stop the operation of the watch by an arrangement of levers mounted in a circle on a plate of the horological movement. The levers can occupy a rest position or an active position wherein they act to directly activate the stop lever to temporarily stop the operation of the watch in any position of the tourbillon cage and of the stop lever.

Figure 1:
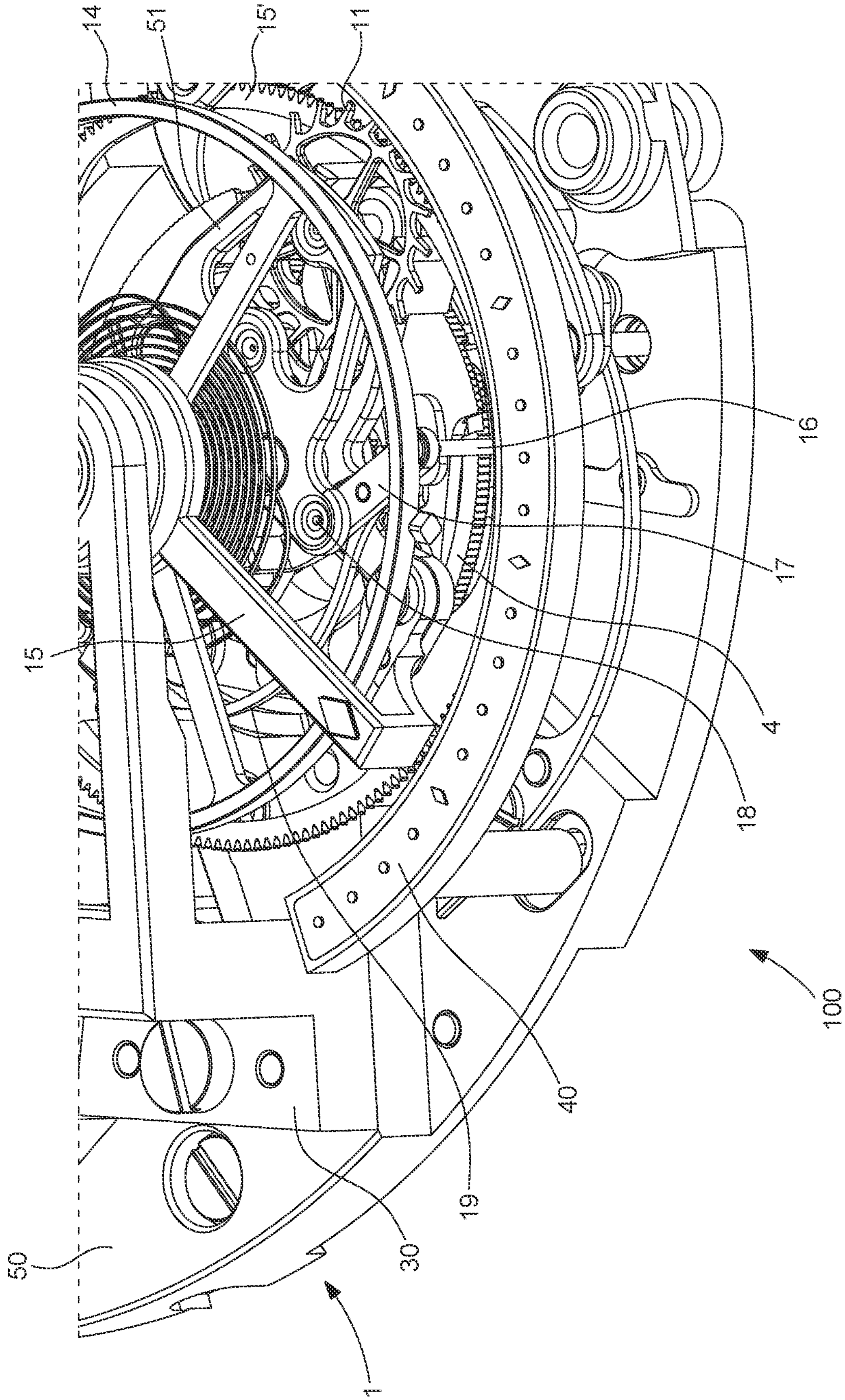
FIG. 1 shows a partial three-dimensional top view of a mechanical tourbillon movement watch having a device for temporarily stopping the operation of the mechanical watch according to the invention.

FIG. 1 shows a partial three-dimensional top view of a mechanical tourbillon movement watch 1 having a device 100 for temporarily stopping the operation of the mechanical watch. The temporary stopping of the operation of the mechanical watch takes place when said watch is time reset by the conventional actuation of a crown rod, which is not shown.

The watch 1, partially shown, comprises a mechanical horological movement having a finishing geartrain, which is not shown. The watch 1 also comprises a tourbillon cage 15, which encloses a resonator 14, which is in this case a balance spring, and an escapement mechanism with a Swiss lever and an escapement mobile 11 in the shape of a wheel. The escapement mobile 11 is arranged to be able to rotate in the same direction of rotation at each half-oscillation of the balance spring 14. The escapement mobile 11 meshes with a fixed seconds wheel 15'.

The tourbillon cage 15 rotates at the speed of one revolution per minute and is made of the various bridges necessary for its function, for example lower bearing bridge 51 of the tourbillon, grouped together under the name cage 15. The tourbillon cage 15 is maintained rotating between the tourbillon bar 30 and the plate 50 of the mechanical movement. Also part of the device 100 for temporarily stopping the operation of the watch rotates with the tourbillon cage 15. This part of the device 100 is a stop lever 17 rotatably mounted about an axis 18 on the cage 51, the spring 19 of the stop lever and the balance stop cam 20 mounted on the balance axis 14. This stop lever 17 comprises at a first end, a rotation control rod 16 projecting under the tourbillon cage 15 and controlled by a set of levers 4 disposed in a circle on the plate 50 as explained below with reference to FIG. 2. The stop lever 17 comprises at a second end, not visible in FIG. 1, a stop element for temporarily stopping the operation of the watch 1 by blocking the balance spring at its axis, for example in contact with a stop cam 20 on the axis of the balance spring 14. The stop lever 17 is held in a rest position by a spring 19 fastened on the one hand on the stop lever 17 between the control rod 16 and the axis of rotation 18, and on the other hand, is fastened on the cage 15. The shape of the spring 19 may be a portion of a circle.

It is clear that it is possible to stop the balance 14 by the stop element of the stop lever 17 also against an axis integral with the balance or against a felloe of the balance.

The tourbillon cage 15 may comprise an indicator element at one of its ends for indicating the seconds opposite a dial 40 in the shape of a ring portion, mounted on the plate 50 and disposed at the periphery coaxially with the tourbillon cage 15. The dial 40 comprises indexes representing seconds, where the indicator element (for example a diamond) of the tourbillon cage 15 allows the rotation of the tourbillon cage 15 to indicate the seconds.

Figure 2:
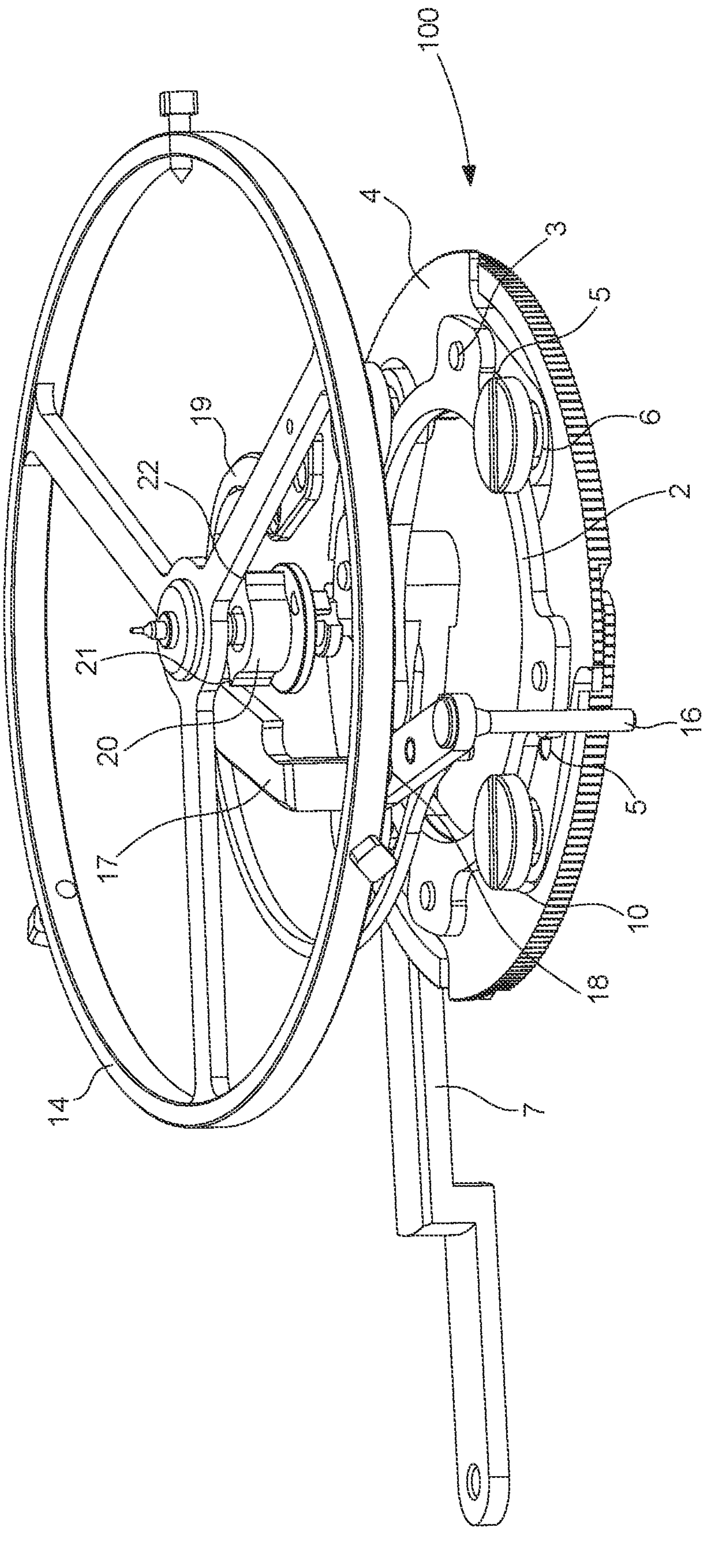
FIG. 2 shows a simplified three-dimensional top view of the watch with the balance shown to reveal the main components of the device for temporarily stopping the operation of the mechanical movement of the watch according to the invention.

FIG. 2 shows all the essential elements of the device 100 for temporarily stopping the operation of the watch, except the balance 14, which is intended to be stopped by the stop device when time resetting the watch. As previously indicated, the device 100 is a stop lever device 17. This stop lever 17 can temporarily stop the operation of the watch by blocking the balance spring at its axis, for example in contact with a balance stop cam 20 on the axis of the balance spring 14. The stop lever 17 is held in a rest position by a spring 19 fastened, on the one hand, on the stop lever 17 between the control rod 16 and the axis of rotation 18, and on the other hand, is fastened on the cage support. The shape of the spring 19 may be a portion of a circle.

The shape of the balance stop cam 20 is arranged with at least one point 21 which, under the effect of the stop lever, ensures a stop position of the balance out of its point of rest and guarantees a restart of the balance at the end of activation of the mechanism. Advantageously, the cam includes two points 21 and 22 to ensure zero unbalance which does not disturb the isochronism of the balance spring resonator.

In a first embodiment, the stop device 100 essentially comprises at least three levers, or even four levers 4 or more which are rotatably mounted about an axis fastened in a hole 6 on a plate not shown in FIG. 2. Preferably, as shown in FIG. 2, each lever 4 comprises at one end the hole 6 for the passage of an axis of rotation, which can be directly a screw 10 for mounting each lever on the plate. All the levers form a circle in the active position, also even in the rest position.

The device 100 also comprises an action member 2 of the levers 4. This action member 2 can be in the shape of a control ring, part of the periphery of which is disposed in contact with the screw rods 10 to allow it to rotate in contact with the screws 10 which form a rotary guide. The action of these levers 4 occurs when time resetting the watch. The control ring 2 comprises elevated portions at the periphery of the ring equal in number to the number of levers 4 disposed in the shape of a circle. Each elevated portion comprises a through opening for the passage of a control rod or pin 3, held stationary through the opening of each elevated portion. In the case shown in FIG. 2, there are 4 levers rotatably mounted on the plate. Each lever 4 is composed from the rotation hole 6 on the plate, of a first control part followed by a second part in the shape of a circular leaf. In the first part of each lever 4, an oblong-shaped guide opening 5 is made for the passage of the control rod 3. In a first position of each control rod or pin 3 in each corresponding oblong opening 5, each lever 4 is in a rest position while in a second position of each control rod 3 in each oblong opening 5, there is an active position for the action of the stop lever 17 of the device.

Switching all the levers 4 at the same time from the rest position to the active position is achieved by means of a control connecting-rod 7, which is connected at least to a member for time resetting the watch. The connecting-rod is connected by a rod 8 through an opening of an elevated portion of the ring and into an oblong-shaped opening 5 of one of the levers. Of course, this rod 8 can be directly the control rod or pin 3. However, the connecting-rod is connected by the rod 8 to the control ring 2 from below the levers, while the control ring 2 covers the levers 4 from above. Thus, the control connecting-rod 7 allows switching all the levers 4 at the same time from the rest position T1 to the active position T2 and vice versa by displacement of each control rod 3 and of the rod 8 in each oblong-shaped opening having a guide between the first position and the second inclined position to switch from the rest mode to the active mode and vice versa.

Figure 3A:
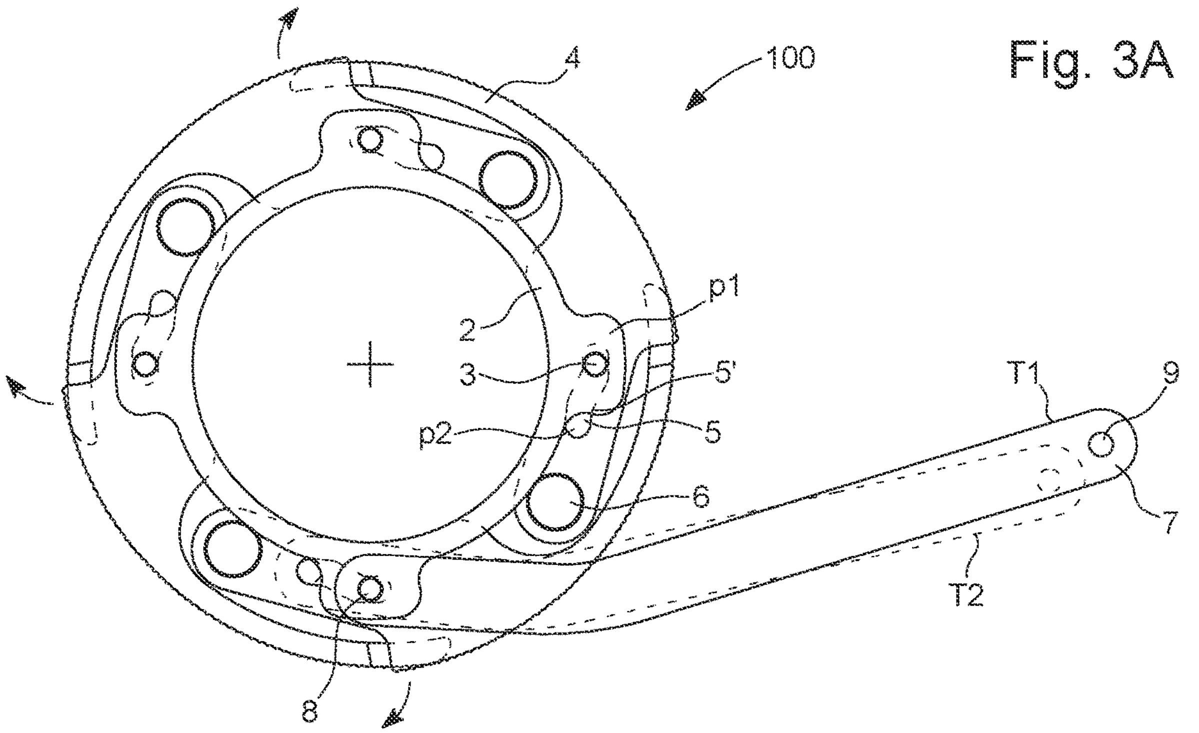
FIGS. 3A and 3B show schematic views of a first embodiment of the device for temporarily stopping the operation of the mechanical watch according to the invention.
Figure 3B:
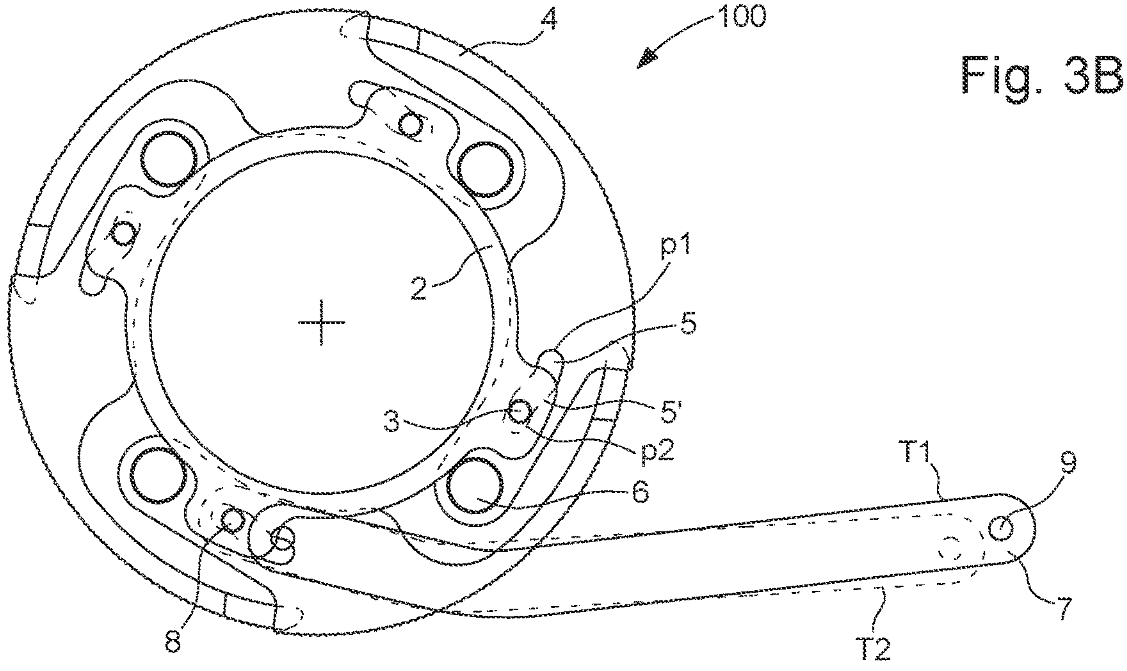

FIGS. 3A and 3B represent exclusively a first embodiment of the arrangement of levers 4 mounted in a circle on a plate of the mechanical movement of the watch of the device 100 to explain switching the levers 4 from the rest position to the active position. As the major part of the components have already been described with reference to FIG. 2, the complete description will not be repeated, in particular of what relates to the stop lever controlled by the levers 4 which is not shown in FIGS. 3A and 3B for simplicity.

Each oblong-shaped opening 5 of the levers 4 comprises an inclination 5' between the first position p1 of the opening 5 and the second position p2. This allows each of the control rods 3 of the control ring 2 to push each lever 4 from its rest position T1 to its active position T2 by the action of the control connecting-rod 7. In this active position, the exterior of the levers 4 forms a circular edge used to push a control rod of the stop lever to temporarily stop the balance spring. Thanks to the shape of a circular edge of the active position of the levers 4, the control by the stop lever of the temporary stop of the balance spring and of the operation of the watch in general, does not depend on the position of the tourbillion cage, which is an advantage.

It should be noted that in order to have this circular edge when the levers 4 are in an active state, that is to say pushed outwards after pivoting for the first embodiment, each free end of the levers in the second part of the lever 4 is of a thickness less than the general thickness of the lever 4. This free end of each lever 4 is disposed in part in a recess of the first part of a successive lever 4 of depth equal to or greater than the reduced thickness of the free end. Thus, both in the rest mode and in the active mode with the levers 4 pushed outwards, the arrangement of the levers in a circle means that in the active position, the exterior of the levers always defines a continuous circular edge to activate the stop lever in order to stop the operation of the watch in any position of the balance spring, of the stop lever or of the tourbillon cage.

FIG. 3A shows a rest position T1 of the levers 4 each mounted to rotate about a respective rod, for example a screw passing through the hole 6. The control connecting-rod 7 is connected to the time-setting mechanism of the watch through an opening 9 of a first end of the connecting-rod 7. A second end of the connecting-rod is fastened by a rod 8 through an oblong opening 5 of one of the levers 4 and fastened in a through opening of the control ring 2.

Note that the control rod or pin 3 is in a first position p1 of the oblong-shaped opening 5 for each lever 4. In this position all the levers 4 are remote from the control rod of the stop lever. As previously indicated, the free ends of each lever 4 are preferably of a thickness less than the general thickness of the lever 4 to be in a recess in the first part of another successive lever in the rest position. The depth of this recess may be greater than or equal to the thickness of the free end of the lever 4, to have a thickness equal to or less than the major part of each lever 4.

To switch from the rest mode to the active mode shown in FIG. 3B, the control ring 2 with its control rod or pin 3 must switch from position p1 of each oblong-shaped opening 5 of each lever 4 to position p2 having followed an inclination 5' of the oblong-shaped opening 5. The inclination 5' of each oblong-shaped opening 5 decreases towards the centre of the first position p1 defining a rest mode at a second position p2 defining an active mode. Switching from the rest position to the active position T2 is performed by pushing the control connecting-rod 7 to rotate the control ring 2 and thus displace, as shown by the arrows in FIG. 3A, the various levers 4 remote from the centre of the circle to control the stop lever by its control rod. The connecting-rod is shown in dashed lines in the active position T2. Both in the rest position and in the active position of this FIG. 3B, all the levers 4 are activated at the same time and the periphery of these levers 4 to activate the stop lever forms a continuous circular edge. This provides an advantage of this configuration, because regardless of the position of the tourbillon cage or of the stop lever in the active position of the levers 4, a control of the stop lever to temporarily stop the operation of the watch can be easily achieved.

Figure 4A:
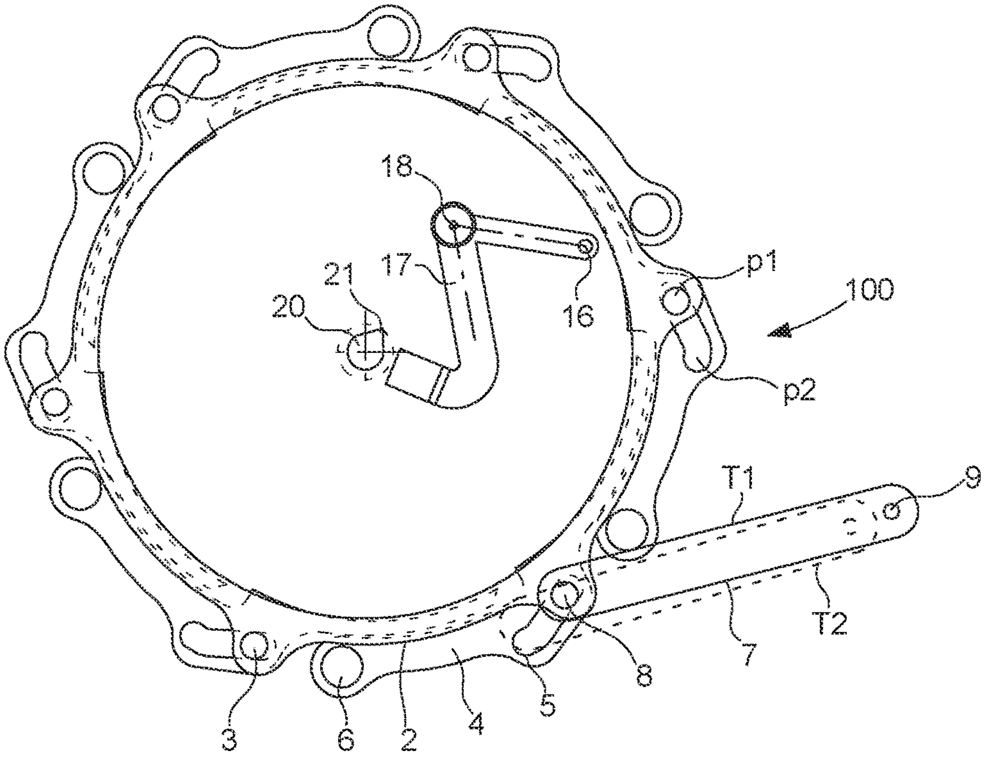
FIGS. 4A and 4B show schematic views of a second embodiment of the device for temporarily stopping the operation of the mechanical watch according to the invention.
Figure 4B:
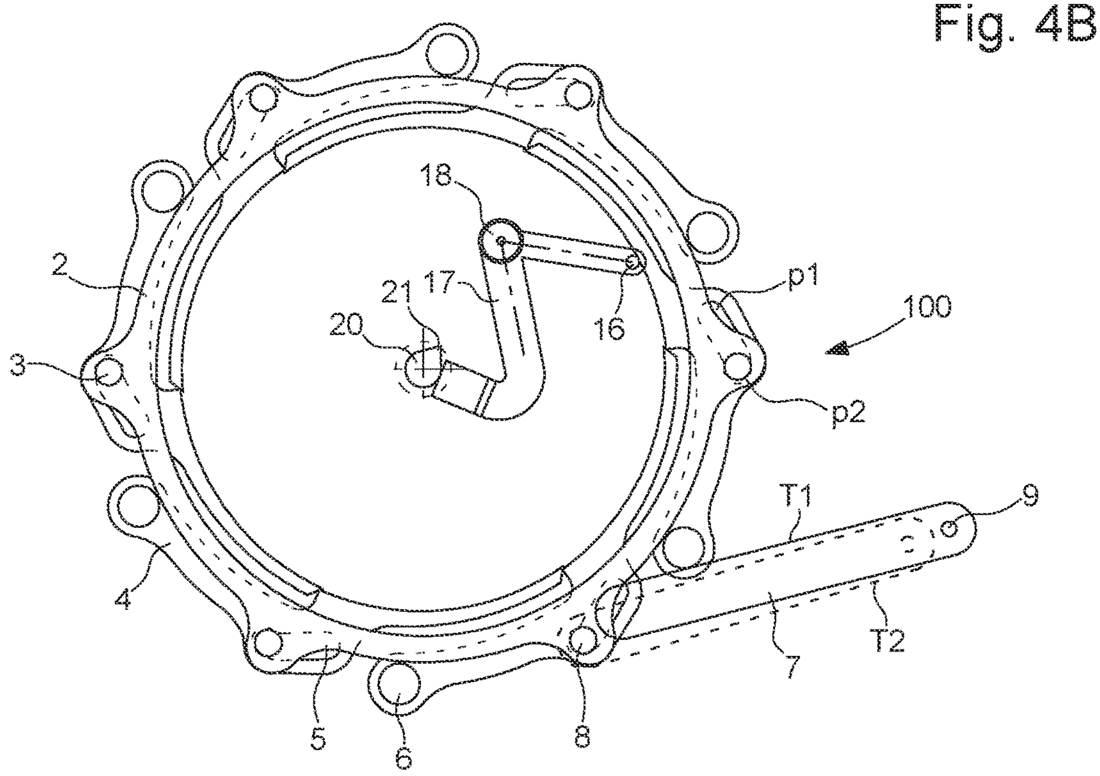

A second embodiment of the device for temporarily stopping the operation of the watch is shown in FIGS. 4A and 4B. FIG. 4A shows a rest position of the device while FIG. 4B shows an active position of the device via an action by the control connecting-rod 7.

This second embodiment mainly differs from the first embodiment in that the levers 4 are in the rest position towards the outside and remote from the control rod 16 of the stop lever 17. As shown in FIGS. 4A and 4B, each lever 4 is rotatably mounted on the plate about an axis of a rod which may be a screw passing through the hole 6 at one end of each lever 4. The screws passing through each hole 6 also allow to fasten all the levers 4 on the plate.

Six levers 4 are provided in this second embodiment. These six levers 4 each comprise, on a first lever portion, an oblong-shaped opening 5, which comprises an inclination to receive each control rod or pin 3 of the control ring 2. The inclination 5' of each oblong-shaped opening 5 increases towards the centre of the first position p1 defining a rest mode to a second position p2 defining an active mode. The control ring 2 is mounted on the plate coaxially with the axis of the balance spring or the tourbillon cage. To switch from a rest mode in position p1 of the oblong-shaped opening 5, to an active mode in position p2 of the oblong-shaped opening 5, the control ring 2 rotates in particular in the clockwise direction. Each control rod 3 will follow the inclination of the oblong-shaped opening 5 so as to rotate each lever 4 inwards towards the centre of the circle via an action by the control connecting-rod 7.

In the active phase in FIG. 4B, the levers 4 move towards the inside of the circle to contact the control rod 16 of the stop lever 17 in order to rotate the stop lever about its axis of rotation 18 with a stop portion at its end opposite to the control rod 16, to contact a cam 20 on the axis of the balance spring so as to temporarily stop it to reset the time of the watch.

It should be noted that both for the first embodiment and for the second embodiment, provision may be made to place the oblong-shaped openings 5 on the control ring 2, which are equal in number to the number of levers 4. The control rods or pins 3 can each be placed on a corresponding lever 4 which are equal in number to the number of oblong-shaped openings 5. Each control rod or pin 3 is inserted into one of the oblong-shaped openings 5 of the control ring 2. The oblong-shaped openings 5 on the control ring 2 have a decreasing inclination or an inclination increasing towards the centre from a first position p1 of a rest mode to a second position p2 of an active mode.

The control ring 2 is rotated by the activation of a control connecting-rod 7 to switch from a rest mode in a first position p1 to an active mode in a second position p2 wherein each lever 4 pivots on an outer side if the inclination is decreasing, or on an inner side if the inclination is increasing. Each lever 4 is in an active position by the action of each control rod or pin 3 in the oblong-shaped openings 5 of the control ring 2 from the first position p1 to the second position p2. Each lever 4 pivots on an outer side if the inclination is decreasing, or on an inner side if the inclination is increasing to be in an active position by the action of each control rod or pin 3 from the first position p1 to the second position p2 of each oblong-shaped opening 5. Thus, this allows to activate the stop lever 17 by the control rod 16 from the inside with the decreasing inclination or from the outside with the increasing inclination of each oblong-shaped opening 5.

Figure 5A:
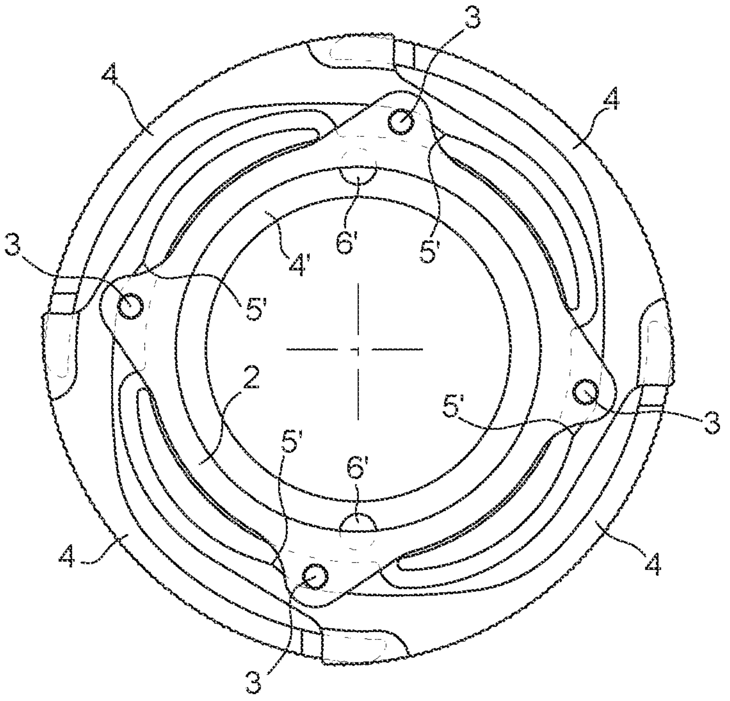
FIGS. 5A and 5B show schematic views of a third embodiment of the device for temporarily stopping the operation of the mechanical watch according to the invention, wherein the levers are joined to form a single flexible leaf component.
Figure 5B:
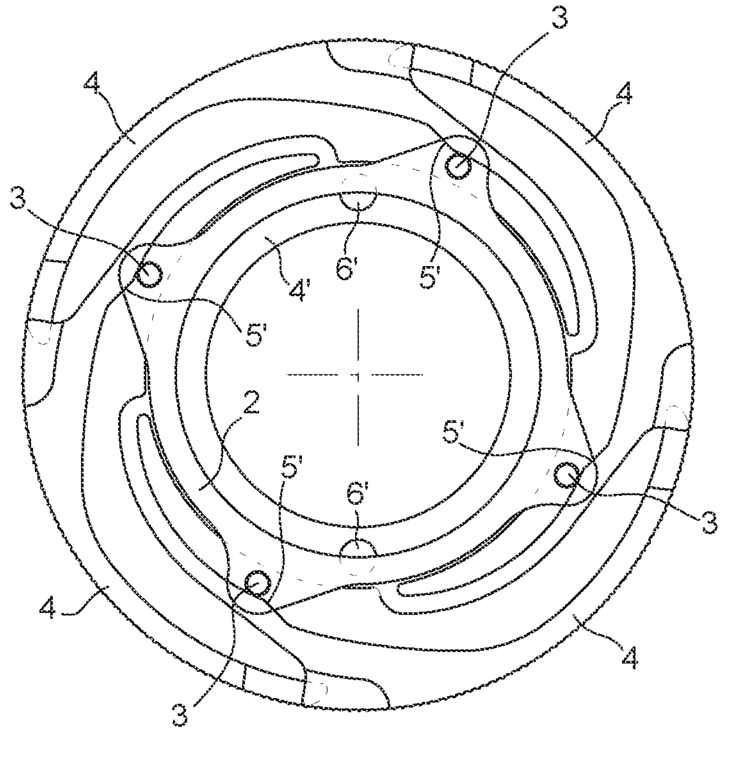

FIGS. 5A and 5B show a third embodiment of the device for stopping the operation of the watch. It is only represented in these FIGS. 5A and 5B that the arrangement of the levers 4 on the plate to define the switching from a rest mode in FIG. 5A to an active mode in FIG. 5B via the control connecting-rod, which is not shown. There are normally at least three levers 4. In the active phase, the levers 4 are pushed outwards to contact the control rod of the stop lever not shown in these FIGS. 5A and 5B.

However, it is also possible to consider a design of this inverted mechanism with a free position of the spring leaves corresponding to the active position and a constrained position corresponding to the inactive or rest position.

As for the first embodiment, four levers 4 are shown, for example. However, it is conceivable to use at least three levers 4 disposed in a circle coaxially with the axis of the balance spring or the tourbillon cage. The difference of this third embodiment compared to the first embodiment and the second embodiment, is that each lever 4 consists of flexible leaves in the shape of a spring. There is therefore no defined axis of rotation of these levers 4, because they are all fastened at a first end to a base ring 4' which can be fastened on the plate by means of screws, which are not shown, and passing through the openings 6' of the base ring 4'. The two openings 6' provided are disposed at 180° from each other on the base ring.

It is also possible in a variant to design an arrangement of levers 4, where each lever is in the shape of a flexible leaf and comprises a ramp on an outer surface of each lever. The corresponding control rod or pin 3 of the control ring 2 passes over the outer surface and said ramp to push the lever 4 inward when switching from the active position to the rest position of the levers 4.

The levers 4 and the base ring 4' preferably form a single component. In addition, there is no oblong-shaped opening in each lever, since it consists of flexible leaves in the shape of a spring. The control ring 2 is disposed on the single lever component 4 and rotatably mounted on the plate with each control rod or pin 3 in contact respectively with an interior or exterior surface of each lever 4. A ramp 5' on each lever 4 is made on the side of the inner or outer surface of each lever to allow switching from the rest mode in FIG. 5A to the active mode in FIG. 5B during the rotation of the control ring 2 in the clockwise direction. The control rods or pins 3 of the control ring 2 will push the levers 4 as the ramp passes outwards or inwards to activate the stop lever through its control rod in the active mode.

As the levers 4 consist of flexible leaves such as springs, switching from the active mode to the rest mode is done automatically as the leaves of each lever are spring leaves. As before, each free end of the levers 4 is of a thickness less than the general thickness of the single component with levers 4. This free end of each lever 4 is partially disposed in a recess of a successive lever 4 of depth equal to or greater than the reduced thickness of the free end.

As for the first embodiment, in this third embodiment, both in rest mode and in active mode, the levers form a circular edge at the periphery. Thus in the active mode, the levers 4 allow to easily activate the stop lever in order to stop the operation of the watch in any position of the balance spring, the stop lever or the tourbillon cage. This also provides an advantage of this configuration, because regardless of the position of the tourbillon cage or of the stop lever in the active position of the levers 4, a control to activate the stop lever to temporarily stop the operation of the watch is easily carried out.

From the description which has just been given, multiple variant embodiments of the device for temporarily stopping the operation of the mechanical watch and in particular of the mechanical tourbillon watch can be designed by the person skilled in the art without departing from the scope of the invention defined by the claims.

The invention claimed is:

1. A device (100) for temporarily stopping the operation of a mechanical watch (1), the device comprising at least three levers (4) assembled and disposed in a circle on a plate (50) of a mechanical horological movement, at least one action member (2) of the levers (4) to switch the levers (4) together from a rest mode to an active mode to act directly on a stop lever (17) of the device, which is arranged to temporarily stop an oscillator (14) of the mechanical horological movement, the activation of the stop lever (17) being able to be carried out by at least one of the levers (4) regardless of the position of the stop lever (17), wherein the levers (4) are arranged on the plate (50) so that in the active mode, the levers (4) define a continuous circular peripheral edge to activate the stop lever (17) in any position of a tourbillon cage (15).

2. The device (100) according to claim 1, said device (100) being adapted to temporarily stop the operation of a mechanical tourbillon watch, wherein the tourbillon cage (15) encloses the oscillator (14) connected to an escapement mobile (11) and the stop lever (17), wherein the at least one action member (2) is a control ring (2) concentric with the axis of the tourbillon cage (15).

3. The device (100) according to claim 2, wherein the stop lever (17) is rotatably mounted about an axis of rotation (18) on the tourbillon cage (15), wherein the stop lever (17) is held in the rest position by a spring (19) fastened to the tourbillon cage (15), and wherein the stop lever (17) can be activated by at least one of the levers (4) to temporarily stop the oscillator, the oscillator being a balance spring (14), and the stop lever (17) bearing against the balance spring, whether against a cam on the axis of the balance, or against an axis or against a balance felloe.

4. The device (100) according to claim 1, wherein the at least three levers (4) are disposed in the shape of a circle on a plate (50) and rotatably mounted about an axis of a rod passing through a corresponding hole (6) of each lever.

5. The device (100) according to claim 4, wherein each lever (4) comprises on a first part an oblong-shaped opening (5), wherein the at least one action member (2) is a control ring (2) comprising openings equal in number to the number of levers (4), provided to fixedly receive a control rod or pin (3), each of the control rods or pins (3) being inserted into the oblong-shaped opening (5) of a corresponding lever (4) having an inclination decreasing towards the centre from a first position (p1) defining the rest mode to a second position (p2) defining the active mode, and wherein the control ring (2) is rotated by the activation of a control connecting-rod (7) to switch from the rest mode in a first position to the active mode in a second position wherein each lever (4) pivots on an outer side to be in an active position by the action of each control rod or pin (3) from the first position to the second position of each oblong-shaped opening (5), for activation of the stop lever (17) from the inside by the control rod (16).

6. The device (100) according to claim 4, wherein each lever (4) comprises on a first part an oblong-shaped opening (5), wherein the at least one action member (2) is a control ring (2) comprising openings equal in number to the number of levers (4), provided to fixedly receive a control rod or pin (3), each of the control rods or pins (3) being inserted into the oblong-shaped opening (5) of a corresponding lever (4) having an inclination increasing towards the centre from a first position (p1) defining the rest mode to a second position (p2) defining the active mode, and wherein the control ring (2) is rotated by the activation of a control connecting-rod (7) to switch from the rest mode in a first position to the active mode in a second position wherein each lever (4) pivots on an inner side to be in an active position by the action of each control rod or pin (3) from the first position to the second position of each oblong-shaped opening (5), for activation of the stop lever (17) from the outside by the control rod (16).

7. The device (100) according to claim 4, wherein the at least one action member (2) is a control ring (2) comprising oblong-shaped openings (5) which are equal in number to the number of levers (4), wherein each lever (4) comprises on a first part a control rod or pin (3), each of the control rods or pins (3) being inserted into the oblong-shaped opening (5) of a corresponding control ring (2) having a decreasing inclination or an increasing inclination towards the centre from a first position (p1) defining the rest mode to a second position (p2) defining the active mode, and wherein the control ring (2) is rotated by the activation of a control connecting-rod (7) to switch from the rest mode in a first position to the active mode in a second position wherein each lever (4) pivots on an outer side if the inclination is decreasing, or on an inner side if the inclination is increasing to be in the active position by the action of each control rod or pin (3) from the first position to the second position of each oblong-shaped opening (5), for activation of the stop lever (17) from the inside with the decreasing inclination or from the outside with the increasing inclination by the control rod (16).

8. The device (100) according to claim 5, wherein the control ring (2) is kept free in rotation between the levers (4) and screws (10) for fastening the levers on the plate (50), the control ring (2) being able to slide upon contact with rods of the screws during the rotation of the control ring (2) imposed by a control connecting-rod (7) connected to one of the control rods or pins (3) of the control ring or of one of the levers (4) and in connection with time-setting members of the watch (12).

9. The device (100) according to claim 6, wherein the control ring (2) is kept free in rotation between the levers (4) and screws (10) for fastening the levers on the plate (50), the control ring (2) being able to slide upon contact with rods of the screws during the rotation of the control ring (2) imposed by a control connecting-rod (7) connected to one of the control rods or pins (3) of the control ring or of one of the levers (4) and in connection with time-setting members of the watch (12).

10. The device (100) according to claim 7, wherein the control ring (2) is kept free in rotation between the levers (4) and screws (10) for fastening the levers on the plate (50), the control ring (2) being able to slide upon contact with rods of the screws during the rotation of the control ring (2) imposed by a control connecting-rod (7) connected to one of the control rods or pins (3) of the control ring or of one of the levers (4) and in connection with time-setting members of the watch (12).

11. The device (100) according to claim 1, wherein the at least three levers (4) are disposed in the circle on the plate (50), wherein all the levers are in a shape of a leaf and connected directly to a base ring (4') coaxial with the axis of the balance spring (14) forming the oscillator, all the levers and the base ring collectively forming a single component and wherein the at least one action member (2) is a control ring and comprises openings which are equal in number to the number of levers (4), provided to fixedly receive a control rod or pin (3) so as to act on portions of each lever to switch them according to the rotation of the control ring from the rest position to the active position with the levers pushed outwards for activation of the stop lever (17) by the control rod (16).

12. The device (100) according to claim 11, wherein each lever in the shape of the leaf comprises a ramp on an inner surface and against which passes the corresponding control rod or pin (3) of the control ring (2) to push the lever (4) outwards when switching from the rest position to the active position of the levers (4).

13. The device (100) according to claim 11, wherein each lever in the shape of the leaf comprises a ramp on an outer surface and against which passes the corresponding control rod or pin (3) of the control ring (2) to push the lever (4) inwards when switching from the active position to the rest position of the levers (4).

14. The device (100) according to claim 11, wherein from the active position of the levers (4) to the rest position, the levers automatically return to the rest position, the return caused by the levers including flexible leaves of the spring type.

15. The device (100) according to claim 14, wherein from the rest position of the levers (4) to the active position, the levers automatically return to the active position, the return caused by a the levers including flexible leaves of the spring type.

16. The device (100) according to claim 5, wherein a free end of each lever (4) in a second part of the lever is of a thickness less than the general thickness of each lever (4), wherein in the rest position, the free end is housed in a recess of a first part of a following lever, said recess having a depth equal to or greater than the thickness of each free end.

17. The device (100) according to claim 6, wherein a free end of each lever (4) in a second part of the lever is of a thickness less than the general thickness of each lever (4), wherein in the rest position, the free end is housed in a recess of a first part of a following lever, said recess having a depth equal to or greater than the thickness of each free end.

18. The device (100) according to claim 7, wherein a free end of each lever (4) in a second part of the lever is of a thickness less than the general thickness of each lever (4), wherein in the rest position, the free end is housed in a recess of a first part of a following lever, said recess having a depth equal to or greater than the thickness of each free end.

19. The device (100) according to claim 1, wherein the stop lever (17) comprises at a second end opposite to a first end of a control rod (16) a stop element to temporarily stop the operation of the watch (1) by blocking the balance spring at its axis.

20. A mechanical tourbillon watch (1) comprising the device (100) for temporarily stopping the operation of the watch according to claim 1.

* * * * *